United States Patent
Narayanan (12)

(10) Patent No.: US 8,041,679 B1
(45) Date of Patent: Oct. 18, 2011

(54) SYNTHETIC DIFFERENTIAL BACKUPS CREATION FOR A DATABASE USING BINARY LOG CONVERSION

(75) Inventor: Priyesh Narayanan, Kannur (IN)

(73) Assignee: Symantec Operating Corporation, Mountain View, CA (US)

( * ) Notice: Subject to any disclaimer, the term of this patent is extended or adjusted under 35 U.S.C. 154(b) by 429 days.

(21) Appl. No.: 12/133,286

(22) Filed: Jun. 4, 2008

(51) Int. Cl.
*G06F 17/30* (2006.01)

(52) U.S. Cl. ........ 707/645; 707/646; 707/648; 707/678; 711/162

(58) Field of Classification Search ............... 707/604, 707/641–648, 678, 999.202, 999.204; 711/162
See application file for complete search history.

(56) References Cited

U.S. PATENT DOCUMENTS

| | | | |
|---|---|---|---|
| 4,686,620 A | 8/1987 | Ng | |
| 5,043,871 A | 8/1991 | Nishigaki | |
| 6,651,077 B1 | 11/2003 | East et al. | |
| 6,769,074 B2 * | 7/2004 | Vaitzblit | 714/16 |
| 7,032,089 B1 | 4/2006 | Ranade et al. | |
| 7,055,008 B2 | 5/2006 | Niles et al. | |
| 7,099,900 B1 | 8/2006 | Bromley et al. | |
| 7,197,520 B1 | 3/2007 | Matthews et al. | |
| 7,266,655 B1 * | 9/2007 | Escabi et al. | 711/162 |
| 7,421,460 B2 | 9/2008 | Chigusa et al. | |
| 7,702,698 B1 * | 4/2010 | Chakravarthy | 707/804 |
| 7,774,297 B2 * | 8/2010 | VanRiper et al. | 1/1 |

OTHER PUBLICATIONS

"InnoDB Hot Backup Manual"; InnoBase; Dec. 2007; 25 pages.
"ZManda Recovery Manager for MySQL"; Zmanda Open Source Backup; Oct. 2007; 3 pages.
"NetVault:Backup—User's Guide for the NetVault:Backup APM for MySQL"; Version 3.000; BakBone Software; 2007; 124 pages.

* cited by examiner

*Primary Examiner* — Leslie Wong
(74) *Attorney, Agent, or Firm* — Meyertons Hood Kivlin Kowert & Goetzel, P.C.; Jeffrey C. Hood; Joel L. Stevens

(57) ABSTRACT

Creating a synthetic database backup using binary logs. A full backup of a database may be stored, followed by one or more incremental backups. The one or more incremental backups may include first binary log files. A first synthetic differential backup may be created using the first binary log files. Creating the first synthetic differential backup may include translating the first binary log files into a first plurality of SQL statements. The first plurality of SQL statements may be executable to recreate the changes in the database since the full backup. Translating each of the first binary log files into the first plurality of SQL statements may be performed before performing a recovery process to decrease recovery time.

20 Claims, 1 Drawing Sheet

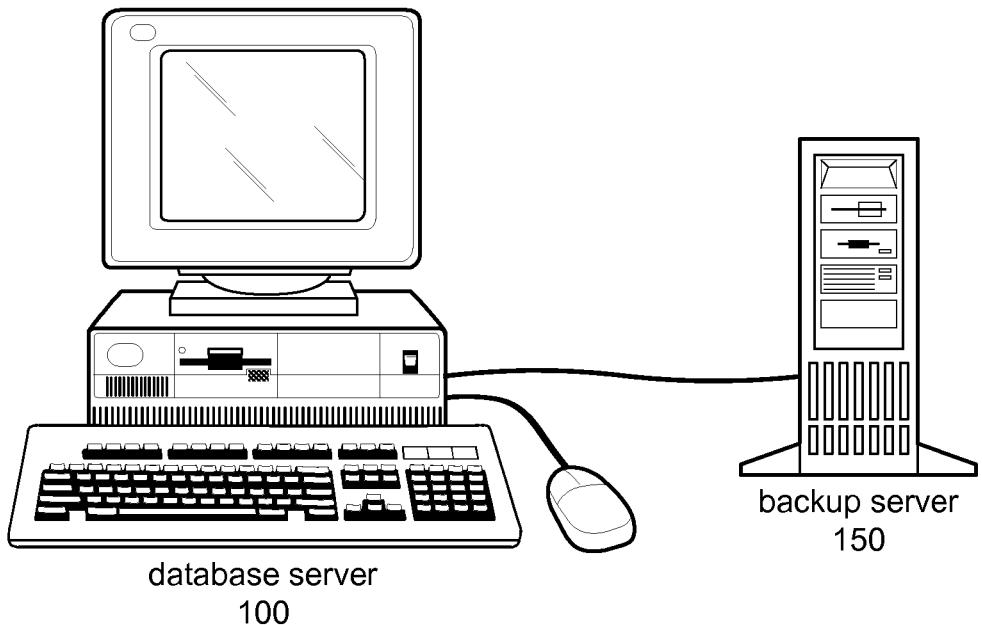

database server
100 backup server
150

FIG. 1

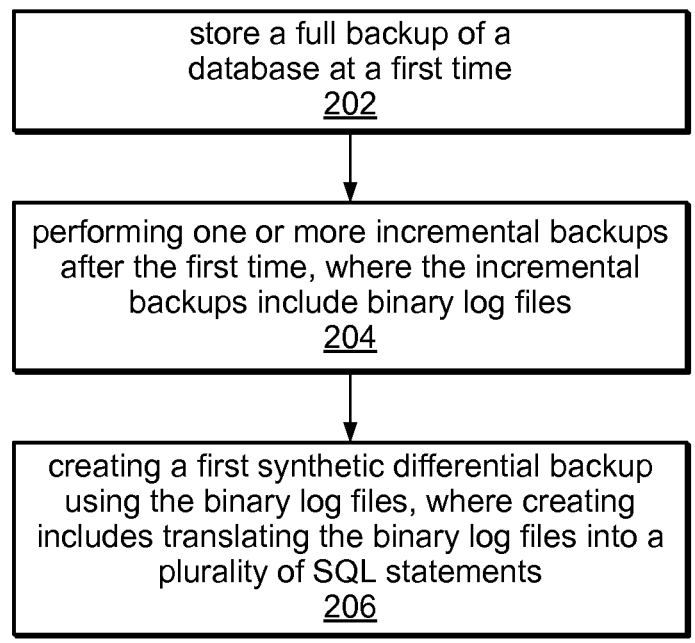

store a full backup of a
database at a first time
202 performing one or more incremental backups
after the first time, where the incremental
backups include binary log files
204 creating a first synthetic differential backup
using the binary log files, where creating
includes translating the binary log files into a
plurality of SQL statements
206

FIG. 2

SYNTHETIC DIFFERENTIAL BACKUPS CREATION FOR A DATABASE USING BINARY LOG CONVERSION

FIELD OF THE INVENTION

The present invention relates to the field of database backup, and more particularly to a system and method for creating synthetic differential backups for a database using binary log conversion.

DESCRIPTION OF THE RELATED ART

Databases have become increasingly popular in recent years, especially in the field of Internet services. In many cases, the data stored in the database are critical, and any loss of data can result in catastrophic losses (of data and money). Accordingly, backing up the data of the database as well as decreasing the amount of time spent in recovery after device failure has also become increasingly popular. One method includes performing full backups of the database on a periodic basis. However, performing full backups is typically a costly proposition as it utilizes many resources and takes a long time (in comparison to backup methods described below). Additionally, full backups typically blocks use of the database while they are being performed. Finally, due to these costs, full backups are not typically performed very often, thereby resulting in more data loss when recovery occurs in comparison to backups that are performed more often.

Some database systems store binary logs of changes or database queries that modify the database, e.g., for backing up purposes and/or record keeping. To address the issues of the full backup discussed above, some prior art methods for backing up databases include incremental and differential backups using the binary log files (e.g., in addition to full backups).

Incremental backups (sometimes referred to as differential incrementals) only backup the changes since the last backup (incremental or full). Typically, incremental backups of such databases purge the binary logs after backing them up. Subsequent incremental backups may therefore be faster as only the changes (logs) since the last incremental need to be backed up. However, during recovery, all incremental backups since the last full backup must be restored in the order of the backups to restore the database, which can be costly (e.g., in terms of time) when the last full backup is old. Said another way, a recovery job making use of incremental backups will be slow as the last full and all the incremental backups since then (until the recovery point-in-time) need to be retrieved and applied. Thus, recovery using incremental backups may be time consuming in cases where there are many incremental backups since the last full backup.

Differential backups (sometimes referred to cumulative incrementals), on the other hand, backup all the changes since the last full backup. Accordingly, differential backups may not purge the binary logs after backing them up (e.g., in order to allow for future differential backups to use these log files). Thus, where a plurality of incremental backups may be required over a period of time since the last full backup, only a single differential backup would be required, which may decrease the required recovery time. However, in comparison to incremental backups, differential backups may require more time during creation (e.g., after the first incremental backup). For example, where backups are performed each day and full backups are performed each week, incremental backups would take approximately the same amount of time each day (only backing up the changes since the previous day's incremental) while differential backups may take increasing amounts of time each successive day (backing up all changes since the last full backup). Thus, performing differential backups may increase the time required to perform the backup (especially at the end of the week, following the example above) and adversely affect database performance.

Thus, incremental backups require less time to perform the backup but more time during recovery while differential backups require more time to perform the backup but less time during recovery. Additionally, it is desirable to decrease the required frequency of performing full backups. Accordingly, improvements in database backups are desired.

SUMMARY OF THE INVENTION

Various embodiments are presented of a system and method for creating synthetic differential backups for a database using binary log conversion.

A full backup of a database, e.g., a MySQL database, may be stored at a first time. The full backup may be a logical backup. The logical backup of the database may include a plurality of SQL statements which may be executable to recreate the database during a restore process. However, other types of backups are envisioned.

One or more incremental backups may be created or performed after the first time. The first one or more incremental backups may include binary log files. The incremental backups may be performed by a database server and a backup server, e.g., by the backup server copying the binary log files from the database server. In some embodiments, the backup server may remove the binary log files from the database server after copying them.

A synthetic differential backup may be created using the binary log files of the incremental backups. In one embodiment, the synthetic differential backup may be created by the backup server or another server, e.g., not the database server. Creating the first synthetic differential backup may include binary log conversion, i.e., translating the first binary log files into a plurality of SQL statements. The plurality of SQL statements may be executable to recreate the changes in the database since the first time. Note that translating each of the binary log files into the plurality of SQL statements may be performed before performing a recovery process, e.g., in order to reduce recovery time.

A second one or more incremental backups may be created after performing the first incremental backups above. The second one or more incremental backups may include second binary log files. Accordingly, a second plurality of SQL statements may be created from the second binary log files. Similar to above, the second plurality of SQL statements may be executable to recreate the changes since the first incremental backups.

Additionally, the second plurality of SQL statements may be appended to the synthetic differential backup to create an updated synthetic differential backup. Accordingly, the SQL statements of the updated synthetic differential backup may be executable to recreate the changes in the database since the first time.

Further, the method may further include creating a full synthetic backup which incorporates the full backup of the database and the synthetic differential backup (e.g., the first or updated synthetic backup). Note that the full synthetic backup may include a plurality of SQL statements that are executable to recreate the database including the changes since the first time.

Finally, a recovery of the database may be performed. Performing the recovery may include restoring the full backup of the database and executing the plurality of SQL statements from the synthetic backup (e.g., the synthetic backup from the first one or more incremental backups or the updated synthetic backup). In one embodiment, the recovery may include restoring the full synthetic backup described above.

Various embodiments described above may be implemented as a computer program and/or as program instructions stored on a memory medium. The memory medium may be distributed across multiple servers or computers or may be on a single medium, as desired.

BRIEF DESCRIPTION OF THE DRAWINGS

A better understanding of the present invention can be obtained when the following detailed description of the preferred embodiment is considered in conjunction with the following drawings, in which:

FIG. 1 illustrates an exemplary database and backup system, according to one embodiment; and FIG. 2 is a flowchart illustrating a method for creating synthetic differential backups for a database using binary log conversion, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary Database and Backup System

FIG. 1 illustrates a database server (or other computer system) 100 coupled to a backup server (or other computer system) 150. The two servers may be connected over a network, such as a local area network (LAN) or wide area network (WAN), such as the Internet, among other network possibilities. Alternatively, or additionally, the two servers may be rackmounted in a server rack.

The computer systems 100 and 150 may be any of various computer systems. For example, each computer system may include a computer processor which may be any of various processing units, as desired. For example, the processor may be a central processing unit (CPU) of various types, including an x86 processor, e.g., a Pentium class, a PowerPC processor, a CPU from the SPARC family of RISC processors, as well as others.

Each computer system may also include a memory medium, typically comprising RAM and referred to as main memory, which may be coupled to a host bus by means of memory controller. The main memory may store an operating system as well as application programs, etc., as well as other software for operation of the computer system. For example, the database server 100 may store one or more databases as well as database software. The databases may be any of various databases. For example, the database may be a SQL database, e.g., a MySQL database. However, other databases and formats are envisioned. The database may be a hierarchical, network, relational, and/or of other type of database, as desired. Similarly, the backup server 150 may store one or more backed up databases (and/or incremental, differential, or synthetic backups) as well as database and/or backup software.

The computer system(s) will typically have various other devices/components, such as other buses, memory, peripheral devices, a display, etc. For example, the computer system(s) may include an I/O interface which may be coupled to a keyboard, display device, printer, mouse, and/or other I/O device. Furthermore, the computer system(s) may include a network adapter and/or port for coupling to a network, e.g., in order to perform backups, as described herein.

FIG. 2—Synthetic Differential Backup Creation Using Binary Log Conversion

FIG. 2 is a block diagram illustrating one embodiment of a method for creating synthetic differential backups for a database using binary log conversion. The method shown in FIG. 2 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 202, a full backup of a database (e.g., a MySQL database, among other database possibilities) may be stored at a first time. The first time may be when the full backup is created. In one embodiment, the full backup may be created or stored by a database backup server, such as the backup server 150 above. The database may be executing or stored by a database server, such as the database server 100 above. However, the database and/or backup server may be distributed among a plurality of database or backup servers, as desired. Thus, in one embodiment, the backup server may create and store a full backup of a database, e.g., from a database server. The database server may continue to provide database results to other clients or server while the backup is performed or may be halted while the backup is performed, according to various embodiments.

In one embodiment, the full backup of the database may be a logical backup of the database. As used herein, "logical backup" is used to refer to a backup which stores statements (e.g., SQL statements) which are executable to recreate the database. Logical backups differ from other types of backups which may be file system specific (e.g., where the full backup is simply a copy of the database, but is only usable on the particular file system on which it was created). Thus, the full backup may be a logical backup which includes a plurality of SQL statements which are executable to recreate the database during a restore process. In one embodiment, e.g., where the database is a MySQL database, the logical backup may be created by using the 'mysqldump' executable. Note that full backups are sometimes referred to "full dumps" of a database. However, it should be noted that other full backups are envisioned, such as the file system backups described above, raw backups, etc.

In 204, one or more incremental backups may be performed and/or created, e.g., after the first time. The incremental backups may include binary log files. For example, the one or more incremental backups may include copying the binary log files from the database server and storing them on the backup server. In one embodiment, the binary log files may be removed from the database server. The binary log files may represent all of the submitted queries or changes to the database since the last time the binary log files have been purged. Thus, the binary log files may be a simple way to retrieve all changes made to the database since the full backup in 202.

In 206, a first synthetic differential backup may be created using the binary log files. Creating the synthetic differential backup may include retrieving all candidate incremental backups and translating the binary log files of the incremental backups into a plurality of SQL statements. For example, where the database is a MySQL database, creating the synthetic differential backup may include executing the utility 'mysqlbinlog' to parse out the SQL statements equivalent to the binary logs. The conversion process may be carried out by a standalone and platform independent utility (such as 'mysqlbinlog' above), thereby allowing servers other than the database server to perform the conversion. Note that creating the synthetic differential backup may be performed before a recovery process is performed, e.g., to reduce the time required when recovery is required (such as when the database server fails or other failures). Additionally, as indicated above, the first synthetic differential backup may be created by the backup server (e.g., and not by the database server), e.g., in order to decrease load and/or down time of the database server. However, the synthetic differential backup may be created by a plurality of servers (e.g., possibly including the backup server), as desired.

In some embodiments, the creation of the synthetic backup may be performed immediately after the incremental backups are performed. However, the synthetic backups may be created on a scheduled periodic basis or when there are spare computational cycles or down time (e.g., of the backup server or other servers, as desired). Thus, creation of the synthetic backup may be dependent or independent of the incremental backups performed in 204.

The method may further include performing additional incremental backups after performing the first incremental backups. These additional incremental backups may also include binary log files. Accordingly, the method may further include translating the additional binary log files into SQL statements (which may be executable to recreate the changes in the database since the previous incremental backups in 204). Finally, the new SQL statements may be appended to the synthetic differential backup of 206 to create an updated synthetic differential backup. The updated synthetic differential backup (e.g., the SQL statements of the backup) may be executable to recreate the changes in the database since the first time.

Additionally, the method may include creating a full synthetic backup which incorporates the full backup of the database as well as the synthetic backup (e.g., created from the first incremental backups in 206 or the updated synthetic backup which incorporates any additional incremental backups. Thus, the full synthetic backup may include a plurality of SQL statements that are executable to recreate the database, including the changes since the first time. Note that since the full synthetic backup is logical, it may be used to recreate the database on a plurality of different file systems, thereby allowing more flexibility in the restore process. Note that creation of the full synthetic backup may be easily performed when the full backup is a logical backup; however, where the full backup is not a logical backup, various procedures may be performed, e.g., to convert the full backup into a logical backup for creating the full synthetic backup. Note further that this conversion process (and/or creation of the full synthetic database) is preferably performed before restoration of the database, e.g., in order to allow for minimum restore times of the database.

Finally, the database may be restored, e.g., in response to a failure of the database (e.g., due to hardware failures). Restoring the database may include restoring the full backup of the database and then executing the synthetic backup (e.g., the SQL statements of the synthetic backup). The synthetic backup may be the most recent synthetic backup (e.g., the updated synthetic backup where additional incremental backups were performed). However, where a full synthetic backup is created, only the full synthetic backup may need to be executed.

Advantages

Thus, the backup method described above allows for the speed of the creation of incremental backups (since they are the backups actually being performed) as well as the speed of recovery of differential backups, thereby overcoming the deficiencies of each method (e.g., by creating differential backups without actually performing a differential backup). Additionally, since the synthetic backups are created by the backup server (or at least a server other than the database server) the increase in speed does not affect the operation or performance of the database or database server. Time efficiency may be 33% better using the methods described above over prior art methods.

Additionally, instead of having to keep track of (or storing) a plurality of incremental backups, a single synthetic differential backup may be stored. Note that this is further simplified when the synthetic differential backup is a full synthetic backup which incorporates the last full backup. This benefit is particularly useful for companies where backups are stored or transferred to external locations from the database and/or backup servers.

Furthermore, as indicated above, full synthetic backups or synthetic backups in addition to logical full backups allow for the additional benefit of letting an administrator recover the database on a plurality of different types of computer systems (e.g., using any of a variety of file systems) or database engines/types. Thus, having logical backups of the database allows for greater flexibility at recovery time.

The above methods may be especially useful in databases which are read-intensive and only have a few updates per day. In these cases, performing regular full backups is overkill and costly, and the synthetic backups described above do not significantly increase the recovery time or required storage sizes in comparison to full backups.

Similarly, the above methods may also be useful for some storage engines (e.g., ARCHIVE storage engine of MySQL) which may only allow for the commands CREATE, SELECT, and INSERT as the combination of synthetic backups and full backups is actually the same as a new full backup (since data is only appended and not modified or removed in these databases).

Note that the binary logs may be smaller than the created synthetic backups, but that in many cases it may not be a significant change and the decrease in recovery time more than makes up for this loss of storage space.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for creating a synthetic database backup, comprising:
   storing a full backup of a database at a first time;
   performing a first plurality of incremental backups after the first time, wherein the first plurality of incremental backups comprise a first plurality of binary log files;
   creating a first synthetic differential backup using the first plurality of binary log files, wherein said creating the first synthetic differential backup comprises translating the first plurality of binary log files into a first plurality of SQL statements, wherein the first plurality of SQL statements are executable to recreate changes in the database since the first time, wherein the first synthetic differential backup represents the changes to the database reflected by the first plurality of incremental backups;
   wherein said translating the first plurality of binary log files into the first plurality of SQL statements is performed before performing a recovery process of the database.

2. The method of claim 1, further comprising:
   performing a second one or more incremental backups after said performing the first plurality of incremental backups, wherein the second one or more incremental backups comprise a second one or more binary log files;
   creating a second plurality of SQL statements from the second one or more binary log files, wherein the second plurality of SQL statements are executable to recreate the changes since the first plurality of incremental backups; and
   appending the second plurality of SQL statements to the first synthetic differential backup to create an updated synthetic differential backup, wherein the SQL statements of the updated synthetic differential backup are executable to recreate the changes in the database since the first time.

3. The method of claim 1, wherein said performing the first plurality of incremental backups is performed by a database server and a backup server, and wherein said creating the first synthetic differential backup is performed by the backup server.

4. The method of claim 1, wherein the database comprises a MySQL database.

5. The method of claim 1, wherein the backup of the database is a logical backup of the database, wherein the logical backup of the database comprises a plurality of SQL statements, wherein the SQL statements are executable to recreate the database during a restore process.

6. The method of claim 1, wherein said performing the first plurality of incremental backups comprises copying the first binary log files and deleting the first plurality of binary log files from the database.

7. The method of claim 1, further comprising:
   performing recovery of the database, wherein said performing recovery comprises:
      restoring the full backup of the database; and
      executing the first plurality of SQL statements.

8. The method of claim 1, further comprising:
   creating a full synthetic backup which incorporates the full backup of the database and the first synthetic differential backup, wherein the full synthetic backup comprises a second plurality of SQL statements that are executable to recreate the database including the changes since the first time.

9. A non-transitory computer accessible memory medium storing program instructions for creating a synthetic database backup, wherein the program instructions are executable to:
   store a full backup of a database at a first time;
   perform a first plurality of incremental backups after the first time, wherein the first plurality of incremental backups comprise a first plurality of binary log files;
   create a first synthetic differential backup using the first plurality of binary log files, wherein said creating the first synthetic differential backup comprises translating the first plurality of binary log files into a first plurality of SQL statements, wherein the first plurality of SQL statements are executable to recreate changes in the database since the first time, wherein the first synthetic differential backup represents the changes to the database reflected by the first plurality of incremental backups;
   wherein said translating the plurality of first binary log files into the first plurality of SQL statements is performed before performing a recovery process of the database.

10. The non-transitory computer accessible memory medium of claim 9, wherein the program instructions are further executable to:
   perform a second one or more incremental backups after said performing the first plurality of incremental backups, wherein the second one or more incremental backups comprise a second one or more binary log files;
   create a second plurality of SQL statements from the second one or more binary log files, wherein the second plurality of SQL statements are executable to recreate the changes since the first plurality of incremental backups; and
   append the second plurality of SQL statements to the first synthetic differential backup to create an updated synthetic differential backup, wherein the SQL statements of the updated synthetic differential backup are executable to recreate the changes in the database since the first time.

11. The non-transitory computer accessible memory medium of claim 9, wherein the database comprises a MySQL database.

12. The non-transitory computer accessible memory medium of claim 9, wherein the backup of the database is a logical backup of the database, wherein the logical backup of the database comprises a plurality of SQL statements, wherein the SQL statements are executable to recreate the database during a restore process.

13. The non-transitory computer accessible memory medium of claim 9, wherein said performing the first plurality of incremental backups comprises copying the first plurality of binary log files and deleting the first plurality of binary log files from the database.

14. The non-transitory computer accessible memory medium of claim 9, wherein the program instructions are further executable to:
   perform recovery of the database, wherein said performing recovery comprises:
       restoring the full backup of the database; and
       executing the first plurality of SQL statements.

15. The non-transitory computer accessible memory medium of claim 9, wherein the program instructions are further executable to:
   create a full synthetic backup which incorporates the full backup of the database and the first synthetic differential backup, wherein the full synthetic backup comprises a second plurality of SQL statements that are executable to recreate the database including the changes since the first time.

16. A server, comprising:
   a processor; and
   a memory medium coupled to the processor, wherein the memory medium stores program instructions for creating a synthetic database backup of a database, wherein the memory medium also stores a full backup of the database at a first time, and wherein the program instructions are executable to:
   perform a first plurality of incremental backups after the first time, wherein the first plurality of incremental backups comprise a first plurality of binary log files;
   create a first synthetic differential backup using the first plurality of binary log files, wherein said creating the first synthetic differential backup comprises translating the first plurality of binary log files into a first plurality of SQL statements, wherein the first plurality of SQL statements are executable to recreate the changes in the database since the first time, wherein the first synthetic differential backup represents the changes to the database reflected by the first plurality of incremental backups;
   wherein said translating the first plurality of binary log files into the first plurality of SQL statements is performed before performing a recovery process of the database.

17. The server of claim 16, wherein the program instructions are further executable to:
   perform a second one or more incremental backups after said performing the first plurality of incremental backups, wherein the second one or more incremental backups comprise a second one or more binary log files;
   create a second plurality of SQL statements from the second one or more binary log files, wherein the second plurality of SQL statements are executable to recreate the changes since the first plurality of incremental backups; and
   append the second plurality of SQL statements to the first synthetic differential backup to create an updated synthetic differential backup, wherein the SQL statements of the updated synthetic differential backup are executable to recreate the changes in the database since the first time.

18. The server of claim 16, wherein the backup of the database is a logical backup of the database, wherein the logical backup of the database comprises a plurality of SQL statements, wherein the SQL statements are executable to recreate the database during a restore process.

19. The server of claim 16, wherein the program instructions are further executable to:
   perform recovery of the database, wherein said performing recovery comprises:
       restoring the full backup of the database; and
       executing the first plurality of SQL statements.

20. The server of claim 16, wherein the program instructions are further executable to:
   create a full synthetic backup which incorporates the full backup of the database and the first synthetic differential backup, wherein the full synthetic backup comprises a second plurality of SQL statements that are executable to recreate the database including the changes since the first time.

* * * * *